July 24, 1951  W. R. WATSON, JR., ET AL  2,562,004
FLEXIBLE MICA INSULATION
Filed June 20, 1950

WITNESSES:

INVENTORS
William R. Watson, Jr.
and Jack Swiss.
BY
Frederick Shapoe
ATTORNEY

Patented July 24, 1951

2,562,004

UNITED STATES PATENT OFFICE 2,562,004

FLEXIBLE MICA INSULATION

William R. Watson, Jr., Pittsburgh, and Jack Swiss, Murrysville, Pa., assignors to Westinghouse Electric Corporation, East Pittsburgh, Pa., a corporation of Pennsylvania Application June 20, 1950, Serial No. 169,232

4 Claims. (Cl. 154—2.6)

This invention relates to flexible mica insulation.

While it has been proposed heretofore to prepare flexible mica tape and other insulating members from mica and a resilient or flexible binder for the mica, certain disadvantages have been associated with each of the previously proposed insulations. Thus, for example, while a binder composed of polyisobutylene has been used to some extent, it has been discovered that polyisobutylene suffers from the disadvantage of depolymerizing rapidly at elevated temperatures, particularly at about 150° C. and higher, so that the polymer decomposes first into low viscosity fluids that possess little bonding and then into volatiles that disappear relatively rapidly leaving a residue of loose, unbonded mica flakes. Other flexible mica insulations are characterized by aging so that they harden appreciably with storage or when used at elevated temperatures, and the insulation is no longer flexible. Even at relatively moderate temperatures of use, certain of the flexible insulation binders employed for mica tend to decompose and produce liquids or gases which puff or swell the insulation, and this causes numerous difficulties in service.

The object of this invention is to provide for flexible mica insulation comprising a permanently flexible binder, which does not age appreciably over long periods of time even at elevated temperatures and further which is capable of withstanding elevated temperatures for prolonged periods of time without evaporating or otherwise deteriorating.

A further object of the invention is to prepare a flexible insulation comprising a layer of mica flakes and a flexible binder therefor comprising a mixture of polymers.

Other objects of the invention will in part be obvious and will in part appear hereinafter.

Figure 1:
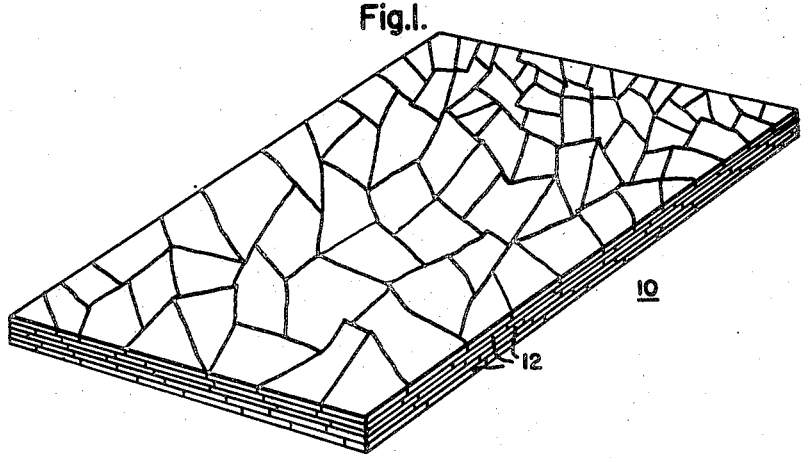
Figure 2:
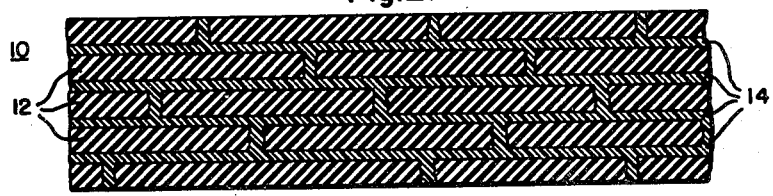
Figure 3:
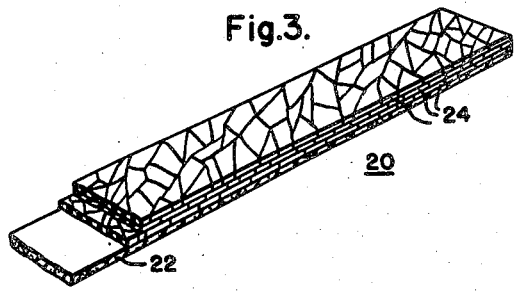

For a better understanding of the nature and objects of the invention, reference should be had to the following detailed description and drawing in which:

Figure 1 is a view in perspective of a sheet of flexible mica insulation prepared in accordance with the invention, Figure 2 is a magnified view through a cross section of the sheet of insulation of Figure 1, and Figure 3 is a perspective partly broken of a flexible mica tape produced in accordance with the invention.

We have discovered an unusually heat stable, non-aging, flexible binder that may be applied to mica flakes to produce therefrom flexible mica sheets, tapes and other insulation. Furthermore, the binders of our invention have low electrical losses so that they may be employed under the most demanding and severe conditions in electrical apparatus.

In particular, the binder composition to be applied to mica flakes in accordance with the present invention is composed of (A) from 95% to 50% by weight of a liquid polymer of at least one aryl compound having ethylenic unsaturation, the liquid polymer having a viscosity of from 100 to 10,000 poises and (B) from 5% to 50% by weight of a copolymer of from 50 to 90 parts by weight of monostyrene or a simple substituted monostyrene and from 50 to 10 parts by weight of a 4 to 6 carbon atom olefinic hydrocarbon compound selected from the class consisting of butadiene, isobutylene, pentadiene-1,3, hexadiene-1,3, and isoprene, the copolymer having an average molecular weight of between 2,000 and 30,000.

The liquid polymer of at least one aryl compound having ethylenic unsaturation may, for example, be alpha-methylstyrene, alpha-methyl-para-methylstyrene, monostyrene, cumarone, indene, and polymers of two or more, for instance, the liquid polymer of a mixture of cumarone, indene and styrene. We have secured excellent results by the use of alpha-methylstyrene of an average molecular weight of between 300 to 4,000 and, in particular, alpha-methylstyrene polymer of a molecular weight of between 700 and 1,000. The copolymer (B) may be prepared by reacting monostyrene, alpha-methylstyrene, alpha-methyl-para-methylstyrene or mixtures of two or more of these with a 4 to 6 carbon atom olefinic hydrocarbon aliphatic compound. One example of a suitable copolymer is the product prepared by polymerizing in aqueous emulsion 130 parts of butadiene and 70 parts of alpha-methyl-para-methylstyrene in 300 parts of water with an aminooleate emulsifying agent using 0.4 part of ammonium persulfate as a polymerization catalyst. Alpha-methylstyrene can be substituted in part or entirely for the alpha-methyl-para-methylstyrene in this preceding example. Also isobutylene, isoprene, pentadiene-1,3 and hexadiene-1,3 can be substituted individually or in admixture for a part or the whole of the butadiene in this example. Another example of the copolymer (B) suitable for use in the practice of the invention may be a compound produced by reacting 85 parts by weight of monostyrene and 15 parts of butadiene to a copolymer having an average molecular weight of 7,000. The reaction of butadiene and styrene in the preparation of synthetic elastomers is well known and need not be set forth herein. Another copolymer is that prepared by reacting 50 parts of styrene and 50 parts of isobutylene reacted as disclosed, for example, in British Patent 586,466 to a molecular weight averaging 10,000. Similarly, the reaction product of 75 parts of monostyrene and 25 parts of isoprene of a molecular weight of between 2,000 and 30,000 may be employed in the practice of the invention. Ordinarily, these (B) copolymers are solid materials, which may be prepared in a finely divided state, for instance, by emulsion polymerization, followed by mastication on a mill and breaking into small particles if desired.

In preparing the flexible binder for application to the mica flakes, it is desirable to combine by admixing the (A) liquid polymer of the ethylenically unsaturated aryl compound and the (B) copolymer in a common solvent. Suitable solvents are toluene, xylene and related benzenoid hydrocarbons, and mixtures of any two or more. Chlorinated aliphatic compounds, such as tetrachloroethane, and turpentine, are examples of other solvents that may be employed. We have found it desirable to produce solutions containing from about 25% to 40% of the mixture of the (A) and (B) polymers dissolved therein.

In preparing the flexible mica insulation, either hand methods may be employed entirely or a mica sheet-forming machine may be employed. In either case, a layer of mica flakes of desired thickness is deposited upon a base or a screen or upon a sheet backing material which is to be incorporated in the flexible mica insulation. Upon this layer of mica flakes, there is deposited the solution of the (A) ethylenically unsaturated aryl compound and the (B) copolymer. The amount of the solution is preferably sufficient to deposit on the mica flakes from 3% to 15% of the weight thereof of the mixture of polymers. Upon evaporation of the solvent from the solution, there will be present on the mica flakes a flexible, tacky, resinous binder. Before drying it is ordinarily desirable to roll the mica flakes to cause the solution of the binder to distribute itself over the surfaces of all the mica flakes. One or more layers of mica flakes may be subsequently deposited and treated with the solution of the binder as desired and rolled after the solution has been applied. Also, a facing sheet may be applied over the mica flakes if it is desired to prepare a sheet or tape provided with a face and a back of a sheet material. The evaporation of the solvent from the binder may be expedited by the use of either heat or vacuum or both. We have secured good results by passing the mica flakes with the applied solution of binder into a forced draft oven maintained at a temperature of about 150° C. so that the solvent is rapidly evaporated.

Referring to Figure 1 of the drawing, there is illustrated a sheet 10 composed of a plurality of mica flakes 12 united to one another by means of the flexible, tacky binder of the present invention. As illustrated in magnified cross-sectional detail in Figure 2 of the drawing, the mica flakes 2 have interposed therebetween the binder 14 comprising (A) from 95% to 50% by weight of the liquid polymer of at least one aryl compound having ethylenic unsaturation and (B) from 5% to 50% by weight of a copolymer of from 50 to 90 parts by weight of a vinyl aryl compound such as monostyrene or a simple methyl substituted monostyrene and from 50 to 10 parts by weight of a 4 to 6 carbon atom olefinic compound.

Referring to Figure 3 of the drawing, there is illustrated a tape 20 comprising a sheet backing 22 upon which there is deposited a layer 24 of mica flakes, the mica flake layer 24, and the backing 22 being united to one another by the flexible, tacky, resinous binder of the present invention. Examples of suitable sheet backing materials 22 for the practice of the invention are kraft paper, rope paper, cambric, linen, glass fiber cloth, cellophane, cellulose acetate film, and asbestos paper. Good results have been obtained from 1 mil thick rope paper. It will be appreciated that in some cases a facing sheet of a material similar to or different from that of the backing 22 may be applied, particularly to enable ease in handling the tape and applying it to electrical members.

The following is an example of a tape prepared in accordance with the present invention:

*Example I*

In a mica sheet-forming machine, there were deposited two layers of mica flakes, the first layer being coated with a toluene solution containing 30% by weight of a binder comprising (A) 70% of poly-alpha-methylstyrene of a molecular weight of 700 and having a viscosity approximately of 2,000 poises and (B) 30% by weight of a copolymer of 85 parts by weight of butadiene and 15 parts of monostyrene polymerized to a molecular weight of approximately 7,000. A second layer of mica flakes was applied and treated with the solution of the binder to give a total thickness of mica flakes of 30 mils. The layers of mica flakes were each rolled after the application of the solution of the binder. Thereafter the sheet of mica flakes with the applied binder was passed into an oven where it was heated for thirty minutes at a temperature of 150° C. to remove the toluene solvent whereby to provide approximately 8% by weight of the resinous binder based on the weight of the mica flakes. The resulting mica insulation was tested at a temperature of 31.5° C. with 60-cycle electric current, and the power factor under these conditions was 2.48%; at one kilocycle, the power factor was 1.38%, and at 39.5 megacycles the power factor was 0.1%.

The mica insulation of this Example I was placed in an oven heated to a temperature 150° C. along with a similar mica tape bonded with 8% by weight of polyisobutylene. After three days, the mica sheet bonded with polyisobutylene had disintegrated into separate loose flakes of mica with no observable amount of polyisobutylene present. The mica sheet of this Example I was found to be firmly bonded and showed no evidence of loose flakes or other deterioration or loss of the binder.

*Example II*

A 30 mil thick sheet of flexible mica insulation was prepared as in Example I using, however, a binder comprising a 25% by weight, solution in a solvent, of (A) 90% of alpha-methylstyrene polymer of a molecular weight of 900 and (B) 10% by weight of the copolymer of 50 parts of monostyrene and 50 parts of isobutylene reacted as in Example I of British Patent 586,466. After being processed as set forth under Example I, the resulting mica insulation was tested at a temperature of 27° C. and found to have a power factor of 1.49% with 60-cycle current, 0.89% at one kilocycle, and 0.06% at 39.5 megacycles. When tested in an oven at 150° C. for three days, the flexible mica insulation was found to be substantially unchanged and still flexible.

Tests of the breakdown voltage of the mica insulation of the present invention indicate that the breakdown strength in volts per mil thickness of insulation for a 30 mil thick mica sheet varied from 1,000 to 2,600 for the sheet of Example I and from 1,800 to 2,100 for the mica sheet of Example II.

The mica insulation of the present invention is particularly suitable for use as mica tape of up to several inches in width for wrapping electrical coils and other electrical conductors requiring the highest grade insulation. The flexibility of the mica insulation, particularly when the tape includes a fibrous sheet backing, enables the tape to be applied tightly and uniformly to conductors. Large sheets of the flexible mica insulation of this invention may be applied for wrapping slot sections of coils and for other related applications.

We have found that the flexible mica insulation prepared in accordance with this invention does not deteriorate or age when exposed to the atmosphere for prolonged periods of time. When applied to coils and the coils subsequently impregnated with varnish, the resinous binder does not form gas bubbles or pockets in the insulation even when held for many days at extremely elevated temperatures of 150° C. and higher. The mica insulation when applied to coils by wrapping may be impregnated or treated with varnishes or other resinous impregnants, and satisfactory adhesion thereto of the applied varnish is obtained. The varnish will cure satisfactorily and form a hard, protective coating which is desirable for many electrical applications.

It is to be understood that small amounts of other resins in an amount not exceeding 10% of the weight of the binder may be present therein in order to provide for suitable viscosity, adhesion and the like. Examples of such additional materials are alkyd resins, asphalts and hydrocarbon resins.

Since certain obvious changes could be made without departing from the scope of the invention, it is intended that all matter contained in the above description shall be interpreted as illustrative and not in a limiting sense.

We claim as our invention:

1. Flexible mica insulation comprising a layer of mica flakes and from 3% to 15%, based on the weight of the mica flakes, of a flexible, tacky, stable binder applied to the mica flakes to unite them into an adherent layer, the flexible binder comprising (A) from 95% to 50% by weight of a liquid polymer of at least one aryl compound having ethylenic unsaturation, the liquid polymer being of a viscosity of from 100 to 10,000 poises, and (B) from 5% to 50% by weight of a copolymer of from 50 to 90 parts by weight of a vinyl aryl compound and from 50 to 10 parts by weight of a 4 to 6 carbon atom olefinic hydrocarbon compound selected from the class consisting of butadiene, isobutylene and isoprene, the copolymer having an average molecular weight of between 2,000 and 30,000.

2. Flexible mica insulation comprising a layer of mica flakes and from 3% to 15%, based on the weight of the mica flakes, of a flexible, tacky, stable binder applied to the mica flakes, the flexible binder comprising (A) from 95% to 50% by weight of a liquid alpha-methylstyrene polymer of an average molecular weight of from 300 to 4,000 and (B) from 5% to 50% by weight of a copolymer of from 50 to 90 parts by weight of a vinyl aryl compound selected from the group consisting of monostyrene and methyl substituted monostyrene, and from 50 to 10 parts by weight of a least one 4 to 6 carbon atom olefinic aliphatic hydrocarbon the copolymer having an average molecular weight of between 2,000 and 30,000.

3. Flexible mica insulation comprising a sheet backing material, a layer of mica flakes applied to the sheet backing material, and from 3% to 15%, based on the weight of the mica flakes, of a flexible, tacky, stable binder applied to the mica flakes to unite them and the backing material into an adherent layer, the flexible binder comprising (A) from 95% to 50% by weight of a liquid polymer of at least one aryl compound having ethylenic unsaturation, the liquid polymer being of a viscosity of from 100 to 10,000 poises, and (B) from 5% to 50% by weight of a copolymer of from 50 to 90 parts by weight of monostyrene and from 50 to 10 parts by weight an unsaturated compound selected from the class consisting of butadiene, isobutylene pentadiene-1,3, hexadiene-1,3, and isoprene, the copolymer having an average molecular weight of between 2,000 and 30,000.

4. Flexible mica insulation comprising a sheet backing material, a layer of mica flakes applied to the sheet backing material, and from 3% to 15%, based on the weight of the mica flakes, of a flexible, tacky, stable binder applied to the mica flakes to bond the mica flakes and the sheet backing material, the flexible binder comprising (A) from 95% to 50% by weight of a liquid alpha-methylstyrene polymer of an average molecular weight of from 300 to 4,000 and (B) from 5% to 50% by weight of a copolymer of from 50 to 90 parts by weight of monostyrene and from 50 to 10 parts by weight of at least one unsaturated aliphatic hydrocarbon selected from the class consisting of butadiene, isoprene and isobutylene, the copolymer having an average molecular weight of between 2,000 and 30,000.

WILLIAM R. WATSON, Jr.
JACK SWISS.

REFERENCES CITED

The following references are of record in the file of this patent:

UNITED STATES PATENTS

| Number | Name | Date |
| --- | --- | --- |
| 2,213,423 | Wiezevich | Sept. 3, 1940 |
| 2,396,293 | Smith | Mar. 12, 1946 |
| 2,401,266 | New | May 28, 1946 |
| 2,416,143 | Berberich | Feb. 18, 1947 |
| 2,459,891 | Nelson et al. | Jan. 25, 1949 |
| 2,477,316 | Sparks et al. | July 26, 1949 |

FOREIGN PATENTS

| Number | Country | Date |
| --- | --- | --- |
| 508,057 | Great Britain | Nov. 29, 1938 |